United States Patent
Hayosh et al.

[11] 3,988,573
[45] Oct. 26, 1976

[54] THREE LINE SCANNER FOR BAR CODE SYMBOLS

[75] Inventors: Thomas D. Hayosh, Bloomfield Hills; John H. Carosella, Avon Township, both of Mich.

[73] Assignee: Schiller Industries, Inc., Warren, Mich.

[22] Filed: June 9, 1975

[21] Appl. No.: 585,143

[52] U.S. Cl. .......................... 235/61.11 E; 250/555
[51] Int. Cl.² .................... G06K 7/10; G08C 9/06
[58] Field of Search ............. 235/61.11 E; 250/555, 250/566, 568; 340/146.3 F

[56] References Cited
UNITED STATES PATENTS

| | | | |
|---|---|---|---|
| 3,728,677 | 4/1973 | Munson | 340/146.3 F |
| 3,902,048 | 8/1975 | Fleischer et al. | 235/61.11 E |
| 3,916,158 | 10/1975 | Sansone et al. | 235/61.11 E |

Primary Examiner—Daryl W. Cook
Attorney, Agent, or Firm—Reising, Ethington, Barnard

[57] ABSTRACT

An optical scanner is disclosed for reading of optical bar codes of the type used for point-of-sale data acquisition. The optical scanner provides a 3-line scan pattern adapted for omnidirectional reading of a bar code symbol. Beam deflection means in the path of a single light beam is operative to deflect the beam about a deflection axis and to tilt the deflection axis from one deflection plane to another after each beam deflection thereby producing three trace segments in separate deflection planes. Trace orienting means in each of the deflection planes redirect the beams so that the trace segments are projected into the scanning field to produce 3-line pattern of trace segments.

15 Claims, 12 Drawing Figures

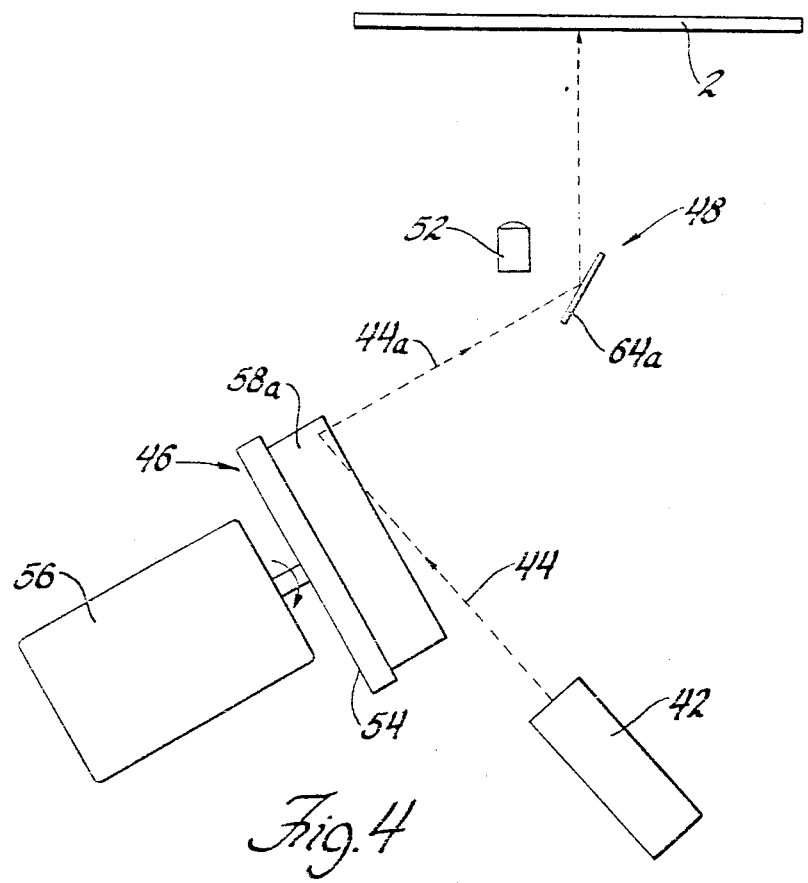
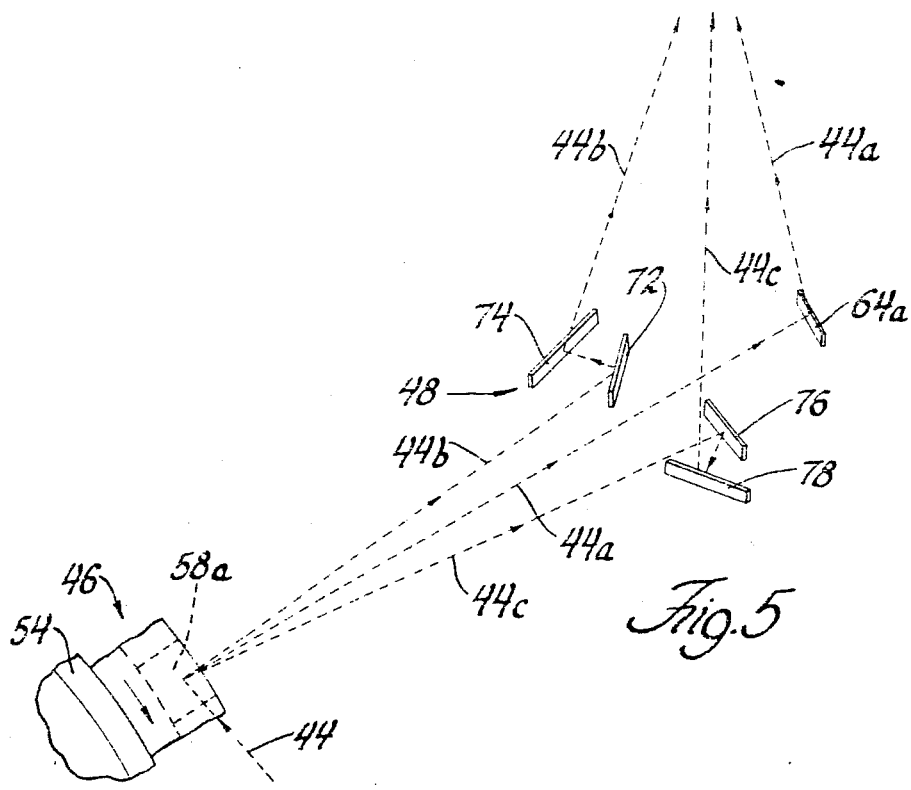

THREE LINE SCANNER FOR BAR CODE SYMBOLS

FIELD OF THE INVENTION

This invention relates to optical scanners aand especially to apparatus for optically scanning encoded data symbols for the purpose of machine reading of the data contained therein. This invention has particular utility in reading of optical bar codes of the type used for point-of-sale data acquisition.

BACKGROUND OF THE INVENTION

An important commercial application of optical scanners for encoded data is that of data processing in connection with supply, storage, and sale of manufactured goods. This invention was developed for application to automated checkstands, i.e., the so-called "point-to-sale" data processing for retail stores and the description will be given with respect to embodiments adapted therefor; however, as the description proceeds, it will be apparent that the invention is useful in a wide variety of optical scanning applications.

In the background of this invention is the adoption by the Uniform Grocery Products Code Council of a machine readable code symbol for the Grocery Industry Universal Products Code (UPC). This UPC symbol has been adopted as a standard for use in automated checkstands in grocery stores in the United States. This standard symbol is of bar code format, as will be described below. The practical application of this symbol depends upon the availability of code readers which have the capability of reading the symbol regardless of its orientation in the reading field, i.e., omnidirectional reading capability.

In the prior art there have been several proposals for achieving omnidirectional reading capability by optical scanners for code symbols of bar code format. A brief discussion of the prior art follows.

An optical code reader adapted for a code symbol of rectangular bar code format is set forth in the Myer U.S. Pat. No. 3,718,761. The system of this patent produces a scan pattern comprising a multiplicity of equiangularly displaced lines. This is obtained by using an optical beam having an elongated transverse cross-section (i.e., producing a line of light on a target) to scan the code symbol. The pattern is executed by scanning the line of light across the field by means of a multifaceted rotating mirror, rotating the line of light in the target plane by a small incremental angle and then scanning again in the new direction. If the angular increments are small enough, the line of light will intercept all of the elements of the code in at least one angular position so as to obtain a reading of the encoded data. This system has the advantage of being able to read a bar code in any orientation relative to the scan pattern even though the information code field is "undersquare," i.e., the height is less than the width, where the height is the dimension parallel to the bar code elements. The system of the Myer patent is disadvantageous in that is requires a complicated optical arrangement and stepwise motion which imposes an undesirably low limit on speed of operation in effecting readout of each code symbol.

Another optical code reader adapted for rectangular bar code symbols is set forth in the Munson U.S. Pat. No. 3,728,677. In the system of this patent a beam is caused to execute an X-scan pattern in a fixed field through which the code symbol is moved. The scan pattern includes two straight line traces in the plane of the scanning field with the traces intersecting at right angles. The traces are directed at an angle of 45° relative to the direction of travel of the article bearing the code symbol. This scan pattern is produced by a multifaceted. rotating mirror coacting with a pair of stationary reflectors which direct the beams from the laser onto the plane of the scanning field.

The Connell U.S. Pat. No. 3,818,444 also discloses an optical code reader for bar-code symbols. In the system of this patent a laser beam is passed through a beam splitter and each of the resulting beams is caused to execute a straight line scan, the scan motions occurring alternately and producing an X-scan pattern. Each of the resulting beams impinges upon a separate multifaceted scanner, each scanner having alternate light and dark facets. The scanners are rotated synchronously and have the light and dark facets out of phase so that only one beam is reflected at a time to produce a trace in the scanning field. Alternately, a single scanner may be used with a suitable beam splitting arrangement. The system of the Connell patent requires a beam splitter to produce a separate beam for each line or trace in the scan pattern.

A particular difficulty with the X-scan pattern of the aforementioned Munson patentand Connell patent is that it affords omnidirectional capability only if the information code field is at least square and for reliable reading it must be somewhat oversquare. Further, it imposes design limitations on the scanning field.

BRIEF SUMMARY OF THE INVENTION

In accordance with this invention, an optical scanning apparatus is provided to produce a scan pattern adapted for omnidirectional reading of an optical bar code symbol. The invention provides a 3-line scan pattern which is effective to increase the opportunity to read a given bar code symbol at a given scan rate and at a given velocity of the bar code symbol through the scanning field. Further, the 3-line scan pattern allows freedom to design the scanning field so as to enhance the human factors which contribute to the well-being and efficiency of the human operator.

Preferably, the apparatus produces a 3-line pattern of nonparallel trace segments having a common point of intersection in a six-pointed star pattern. This is accomplished by a beam deflection means in the path of a single light beam and being operative to deflect the beam about a deflection axis and to tilt the deflection axis from one deflection plane to another after each beam deflection thereby producing plural trace segments in separate deflection planes. Means in each of the deflection planes redirect the beam so that the trace segments are projected into the scanning field to produce plural non-parallel trace segments. Preferably, the trace segments forming the 3-line scan pattern are non-equiangularly related; instead the scanning field is elongated with one line perpendicular to code symbol movement and the other two form an entrance angle which is substantially less than 90°. The beam deflection means preferably comprises a rotatable scanning member with plural sets of beam deflecting optical elements which move successively through the path of the beam. Each optical element, preferably a reflector facet, causes substantially rectilinear deflection of the beam in a given deflection plane and each element of a set deflects the beam in a different deflection plane.

The optical elements are disposed on the rotatable member in a circumferential array and the elements within each set have reflective facets at different angles relative to the axis of rotation.

DETAILED DESCRIPTION

A more complete understanding of this invention may be obtained from the detailed description that follows, taken with the accompanying drawings in which:

FIG. 4 is a diagram showing an elevation view of a portion of the scanning apparatus according to the invention;

FIGS. 5, 6 and 7 show other views of a portion of the apparatus;

Figure 1:
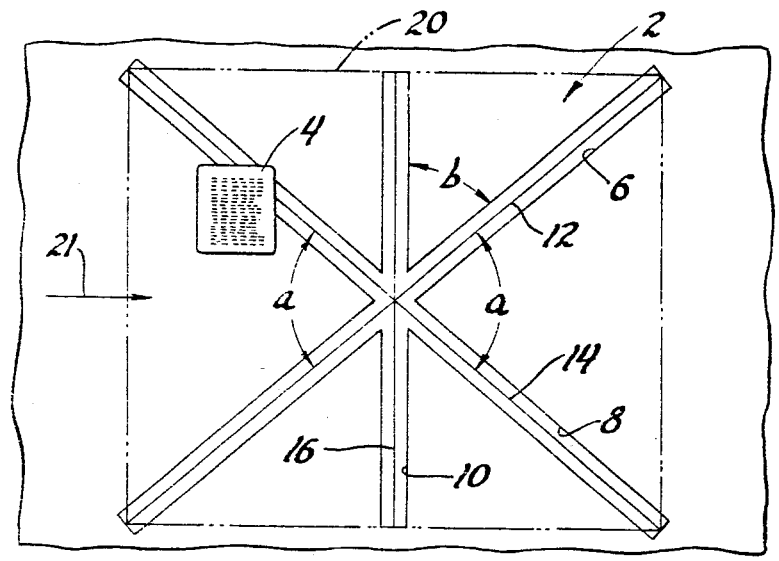
FIG. 1 shows a 3-line scan pattern in a scanning field defined by a window in a service counter forming a part of a checkstand.

Referring now to the drawings, there is shown an illustrative embodiment of the invention in an apparatus especially adapted for optically scanning a bar code symbol disposed at random orientation within a scanning field. The illustrative embodiment may be characterized as an optical scanner for point of sale (POS) data processing using a bar code symbol, such as the Universal Products Code (UPC) symbol which is applied to an article of goods. It will be appreciated, however, that the invention is useful in a wide variety of applications of optical scanning, especially for code reading.

The typical installation site of the apparatus of this invention is a checkstand counter such as that used in supermarkets. The checkstand includes a counter top which the check-out cashier uses as a work surface for processing the products being sold. The counter top is provided with a transparent window over which the products are moved, one-by-one with the code symbol exposed to a scanning beam. The particular data applied to the products by a code symbol may represent information serving various purposes in connection with the business involved. For example, the encoded data may include identification numbers which signify the type of product by category and a number which specifies the particular product and the manufacturer thereof. As a further example, the data encoded may contain price information and inventory control information.

FIG. 1 shows a plan view of a counter top with a window 2 defining a scanning field. A code symbol is depicted as it might be presented on the bottom surface of a package. The window 2 comprises three intersecting slots 6, 8 and 10 which may be inlaid with transparent plastic. The slots are aligned with the traces 12, 14 and 16 of the scan pattern and are coextensive therewith. The scanning field is defined by the rectangle 20 shown in phantom line. The symbol 4 bears encoded data in a code field of predetermined format. The label and hence the code field may be positioned in the scanning field 20 in any angular orientation, i.e., the orientation of the code field is unknown and occurs randomly as the package moves across the scanning field. The scan pattern is a 3-line scan or star-scan pattern comprising traces 12 and 14 at an angle $a$ and trace 16 at an angle $b$ to traces 12 and 14, respectively. The flow direction for the products to be processed is indicated by the arrow 21. The scanning field is aligned so that the trace 16 is normal to the flow direction.

Figure 2:
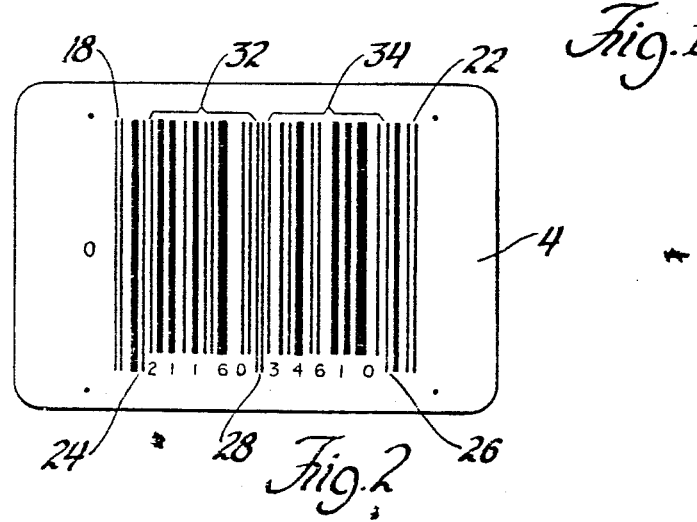
FIG. 2 shows the format of a rectangular bar code symbol.

Before proceeding with the description of the apparatus for producing the scan pattern, the code symbol which is used in the illustrative embodiment will be described. The code symbol, shown in FIG. 2, is typical of code symbols which this invention is especially adapted to read omnidirectionally and is of a rectangular bar code format. This code symbol is representative of the UPC standard symbol adopted by the Uniform Grocery Product Code Council. The bar code symbol is in the form of a series of parallel light and dark bars of different widths for machine reading of the encoded data, together with the equivalent numeric characters in human readable form at the bottom of the code bars.

The symbol shown in FIG. 2 is one version of the UPC standard symbol which contains two information code fields; another version, not shown, contains a single information code field. It will be understood that, insofar as optical scanning is concerned, the same principles apply to both versions. In the version of the symbol to be described below, the two information code fields are juxtaposed. Taken together, the two code fields comprise all the information encoded by the symbol; however, the two information code fields may be read separately, i.e., by different beam scans during a single traverse of the symbol through the scanning field. If the two information code fields are read by different beam scans, or if they are read together by the same beam scan, the information represented by one field is combined with that of the other by the data processing equipment which accepts the output of the optical scanner. Further, the beam scan of a code field may be in either direction across the code bars. The left-hand and right-hand code fields are distinguishable in data processing by virtue of odd parity for one and even parity for the other in the code. One direction of scan is distinguishable from the other by reason of boundary elements which are different at one side of the code field from those at the other side.

In the UPC standard symbol, each character or digit of the code is made up of seven data elements or modules which are either dark or light. Each module represents a binary digit, with the dark module being a binary 1 and the light module being a binary 0. A left-hand guard bar pattern 18 and a right-hand guard bar pattern 22 provide side boundaries for the other code bars. The tall bars 24 represent the number system character and the tall bars 26 represent a modulo check character. The central tall bars 28 separate code bars 32 comprising five characters on the left-hand side from code bars 34 comprising five characters on the right-hand side. Each character of code is represented by two dark bars and two light spaces with each dark bar being made of one, two three or four dark modules. The code characters are printed in human readable form at the bottom of the respective character code bars. A left-hand information code field 36 comprises guard bars 18, number system bars 24, code bars 32 and central bars 28; a right-hand information code field 38 comprises central bars 28, code bars 34, modulo check bars 26 and guard bars 22.

In order to obtain a readout of the code symbol by an optical scanner it is necessary that all of the code bars of one information code field be intercepted by the scanning trace in succession, i.e., in a single sweep across the code symbol. The sweep may be in either direction and it may be at an angle, but it must be continuous for a given code field. In other words, the scanning trace must start with either the guard bars or the central bars on one side of the code field and end with the other on the other side of the code field, having intercepted the guard bars and central bars and all of the bars in between. The direction of the trace in making such interceptions may be rectilinear or curvilinear and a valid readout will be obtained so long as all of the code bars of the code field are intercepted in the one continuous sweep or trace.

Figure 3:
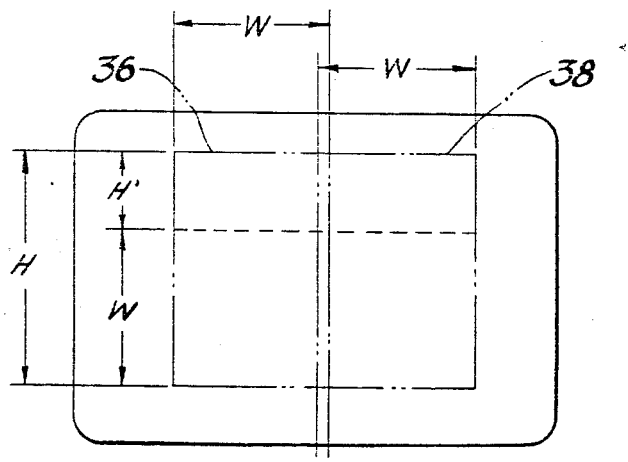
FIG. 3 shows the information code fields of the code symbol.

Referring now to FIG. 3, the significant dimensions of the code fields 36 and 38 are shown in outline form. As discussed with reference to FIG. 2, the code fields 36 and 38 are slightly overlapping due to the fact that both fields include the center bars. Each code field 36 and 38 has a height H and a width W. For purposes of discussion, the ratio of the height to the width of the code field is referred to as the "aspect ratio" and, for the standard code symbol in the version illustrated, the aspect ratio is greater than one. This attribute of the code field, i.e., the ratio of height to width, is also expressed in terms of "squareness". In this terminology, when the code symbol has a height greater than its width it is said to be "oversquare" and if the height is less than the width it is said to be "undersquare." A "square" code field would have a height equal to the width W as indicated by the broken line and the dimensions shown in FIG. 3. The amount of oversquareness is indicated by the dimension H' and it may be expressed as a percentage of the width. The significance of oversquareness is, of course, that it increases the opportunity to read the code for a given product flow rate and spot speed of the scanner while adding to the space required on the product package for printing the code symbol. The standard UPC code symbol of the type illustrated (version A) has a nominal size wherein the width is 0.643 inches and the height is 0.900 inches. The symbol will be used in various magnifications (or reductions) of this size, it being understood that the proportions remain the same. Also other versions of the standard UPC symbol differ in format and aspect ratio from the one illustrated. Additionally, there is a code symbol, known as the truncated symbol, which is used on very small packages and has an aspect ratio much less than unity; however, it is not a UPC standard.

Referring now to FIGS. 4 through 12, the scanning apparatus of the subject invention will be described. The system configuration is especially well adapted for installation under the check-out counter and may be characterized as an "upward looking" scanner. The scanner may be tilted relative to the counter top so that the scanning beam will intercept a vertical surfae of a package and read a code symbol on the side of an upright or tilted package. In general, as shown in FIG. 4 the system comprises a light beam source in the form of a laser 42, such as a helium-neon laser which emits a beam 44 of coherent radiation in the visible portion of the spectrum. A beam deflection means 46 is interposed in the path of the light beam 44 and, as will be described in detail below, causes the light beam to be deflected about a deflection axis and also causes periodic tilting of the deflection axis so that the beam is switched from one deflection plane to another. The beam deflection means 46 functions to transform the single input beam 44 into a plurality of time successive trace seqments each occurring in different deflection planes. In order to orient the successive trace segments in the desired scan pattern in the scanning field, a trace segment orienting means 48 is provided. The orienting means 48, which will be described in detail below, comprises components in each of the deflection planes so as to redirect and suitably orient the trace segment in each of the deflection planes. The redirected trace segments are projected onto the plane of the scanning field to produce the desired scan pattern. In order to detect the interception of the scanning beam with the code elements of the encoded label being scanned, a receiver 52 comprising a photodetector is adapted to respond to the optical signals corresponding to the reflections of the scanning beam from the code symbol. This invention does not depend upon any specific form of receiver 52 and may be used with receivers which are well known, and, therefore, will not be described here. Suffice it to say that the receiver includes a suitable light collecting system and a photodetector for developing a video signal which is representative of the code bars of the code symbol intercepted by the scanning beam.

Figure 9:
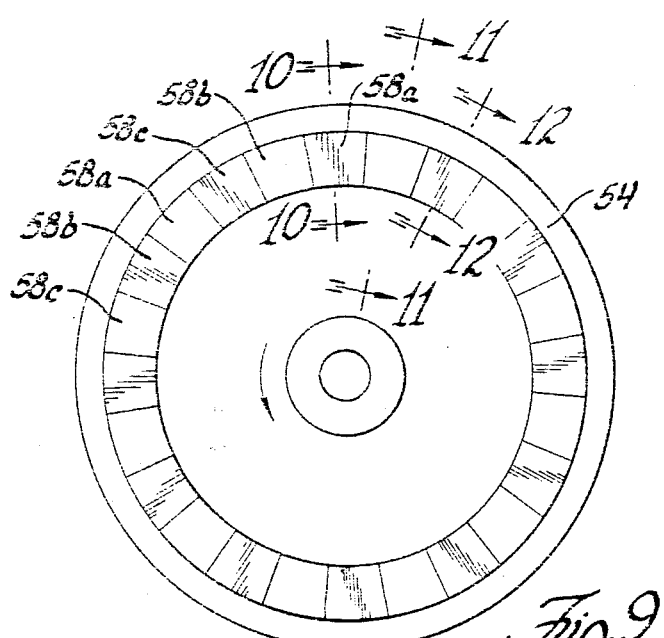
FIGS. 9, 10, 11 and 12 show details of a portion of the apparatus.
Figure 10:
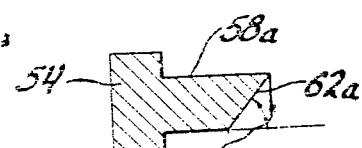
Figure 11:
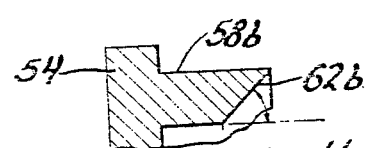
Figure 12:
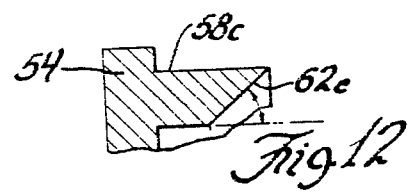

The deflection means 46, as shown in FIG. 4 comprises a rotatable scanning member 54 which is rotatably driven at constant speed by an electric motor 56. The member 54 includes multiple sets of optical elements as shown in FIGS. 9 through 12. The optical elements, as best shown in FIG. 9, are disposed in a circular array which is coaxial with the axis of rotation of the member 54. Each optical element is a reflector 58a, 58b and 58c and has an optically reflective surface of facet 62a, 62b and 62c, respectively. A preferred construction for the scanning member 54, as illustrated, is a unitary structure fabricated by a replication process, although other techniques may be employed and the process of manufacture is not a part of this invention. Each element has a wedge-shaped facet and the reflectors in each set have their facets disposed at different angles relative to the axis of rotation of the member 54. For example, the facets 62a of the reflectors 58a are inclined at 50° relative to the axis, whereas the facets 62b of reflectors 58b are inclined at 45° and the facets 62c of the reflectors 58c are inclined at 40°. The difference in facet angle is illustrated in FIGS. 10, 11 and 12 and exaggerated for the sake of clarity.

As noted above with reference to FIG. 9, all of the reflectors 58a, 58b and 58c are disposed in a circular array which is coaxial with the axis of rotation of the member 54. As indicated in FIG. 4, the light beam 44 from the laser 42, being fixed in position, impinges upon the facets of each of the reflectors 58a, 58b and 58c in succession and in that order as the scanning member 54 rotates. Preferably, the points of impingement by the beam upon all the facets lie in a single plane which is perpendicular to the axis of rotation of the member 54.

Figure 6:
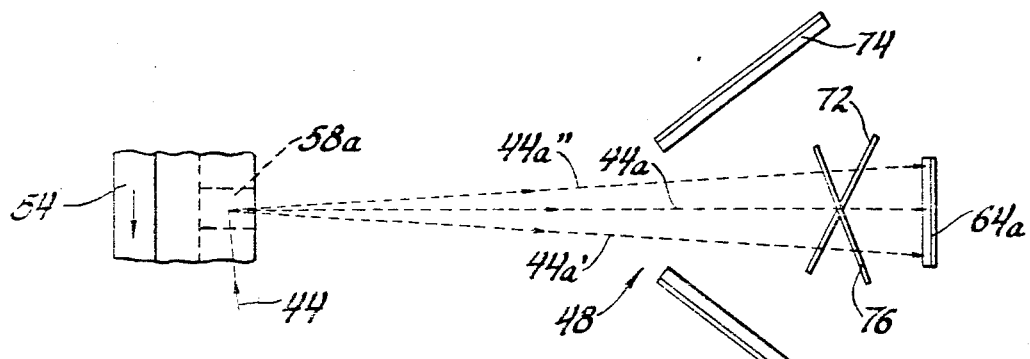

Referring to FIG. 6, there is illustrated a single reflector 58a and its coaction with the light beam and its corresponding components, namely fixed reflector 64a in the trace orienting means 48. It is noted that the beam 44 is intercepted by the facet 62a as the reflector moves in the direction indicated by the arrow. When the beam 44 is first intercepted by the leading edge of the facet 62a it is reflected along the path 44a'' to the reflector 64a and the angle of impingement continually changes as the facet 62a traverses the beam so that the beam is deflected, about a deflection axis, from the angular position of the path 44a'' to the angular position of a path 44a'. The deflection axis is a line extending through the line of impingement of the beam 44 upon the facet 62a and extending in a direction perpendicular to the plane defined by the paths 44a'' and 44a'. It will now be appreciated that each reflector 58a, 58b and 58c, as it intercepts the light beam 44, causes deflection of the light beam in the same manner as that described with reference to reflector 58a in FIG. 6. The deflection plane for each of the facets i.e., a plane in which a deflection angle is swept out, lies more or less parallel to the axis of rotation of the member 54, due largely to the facet angles selected for the reflectors, as shown in FIG. 4. Note that the light beam 44 is directed obliquely relative to the axis of rotation of the member 54. The deflected beam 44a, as seen in FIGS. 4 and 6, will lie in a more or less horizontal plane and will produce a trace which is linear on the surface of the reflector 64a. The reflector 64a is disposed at such an angle that the deflected beam 44a is reflected upwardly and produces the trace 16 on the window 2.

It will be appreciated from the discussion of beam deflection given with reference to FIGS. 4 and 6 that the beam 44a is deflected in a given deflection plane corresponding to the facet angle of the reflector 58a. Since the succeeding reflectors 58b and 58c have successively different facet angles, the beam 44 from the laser is switched successively thereby to different deflection planes.

Figure 7:
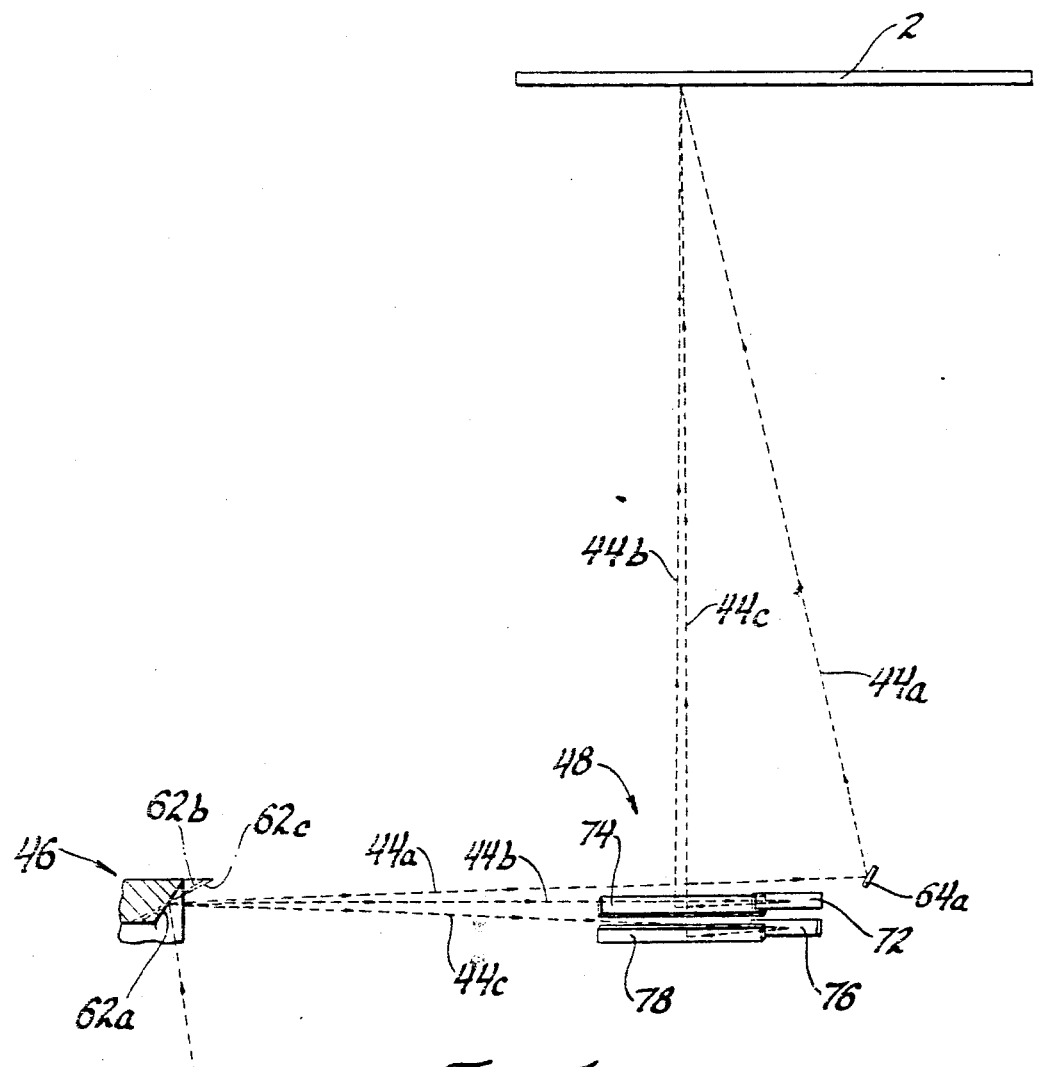

The separation of the deflection planes is most clearly shown in FIG. 7 which is an elevation view of the apparatus. For explanatory purposes, the reflector facets 62a, 62b and 62c are all shown in phantom line with the respective deflected beams 44a, 44b and 44c. It is understood, of course, that these three deflected beams do not occur simultaneously; instead, they occur successively in time as the respective reflectors intercept the light beam 44. Thus, it will be understood from FIG. 7 that the light beam 44 is first intercepted by a facet 62a of reflector 58a and, by reason of the arcuate motion of the facet 62a the deflected beam 44a is produced in a deflection plane perpendicular to the paper as shown in FIG. 7. Thus a trace segment is produced on the reflector 64a and on the window 2 with an orientation determined by the reflector 64a. Next, the facet 62b of reflector 58b produces the deflected beam 44c in a separate deflectin plane and trace segments are produced on reflectors 72 and 74 and thence upon the window 2. Similarly, when the facet 62c of reflector 58c intercepts the light beam, the deflected beam 44c is produced in a separate deflection plane with trace segments appearing on reflectors 76 and 78 and thence on the window 2.

Referring now to FIGS. 5 and 7, the arrangement of the trace segment orienting means 48 is shown in relation to the deflection means 46 and the window 2 with the three different reflectors 58a, 58b and 58c. With different facet angles in each set of reflectors, there are three separate deflection planes, each of which produces a trace segment in the scan pattern. Accordingly, the trace segment orienting means 48 includes optical components for redirecting the beam from each of the three different deflection planes. In FIG. 5 the trace segment orienting means 48 is viewed from a position above and to the right of the beam deflection means 46.

As shown in FIG. 5, a reflector 58a is in position to intercept the beam 44 and since reflector 58a has the largest facet angle of the set of reflectors, the deflected beam 44a lies in the uppermost deflection plane. As described with reference to FIG. 6, the deflected beam 44a impinges upon the orienting reflector 64a and is redirected thereby onto the window 2. Also in FIG. 5 the beams deflected by reflectors 58b and 58c are illustrated even though these reflectors are not shown in this view; these beams 44b and 44c respectively, lie in the intermediate and lowermost deflection planes respectively. The deflected beam 44b (from reflector 58b) impinges upon a reflector 72 which redirects the deflected beam in a more or less horizontal plane toward a reflector 74 which redirects the deflected beam into a substantially vertical plane and onto the window 2. Similarly, the deflected beam 44c (from reflector 58c) impinges upon a reflector 76 which redirects the deflected beam in a more or less horizontal plane onto a reflector 78 which redirects the deflection beam in a substantially vertical plane onto the window 2.

The various reflectors in the beam orienting means 48 just described, are positioned and oriented relative to the deflection means 46 and the window 2, such that a constant length beam path is provided between the deflection means and the window. In other words, the distance from any point of impingement of the beam 44 on the facet 62a along the respective reflection beam path to the reflector 64a and thence from along the respective reflection beam path to the point of impingement on the window 2 remains the same as the facet 62a is moved past the impinging beam 44. Similarly, the distance from any point of impingement of the beam 44 on the facet 62b through the respective reflection beam path to the point of impingement on reflector 72 and thence through the respective reflection beam path to the point of impingement upon reflector 74, and from there through the respective reflection beam path to the point of impingement with the window 2 remains the same as the facet 64b is moved past the impinging beam 44. The same is true of the distance between the point of impingement on the facet 62c, the intermediate points of impingement on reflectors 76 and 78, to the point of impingement on the window 2. The beams 44a, 44b and 44c not only have constant length paths in the scanning motion as stated above, but also the beam paths for beams 44a, 44b and 44c are equal to each other. Further, the alignment of the reflectors in the trace segment orienting means is such that when the beam 44 impinges upon the center of one of the facets 62, 62b or 62c, the reflected beam will follow a path to the center point of the respective trace segment on the window 2. The relationship just described is represented by the diagram of FIG. 8 which is to be discused next.

Figure 8:
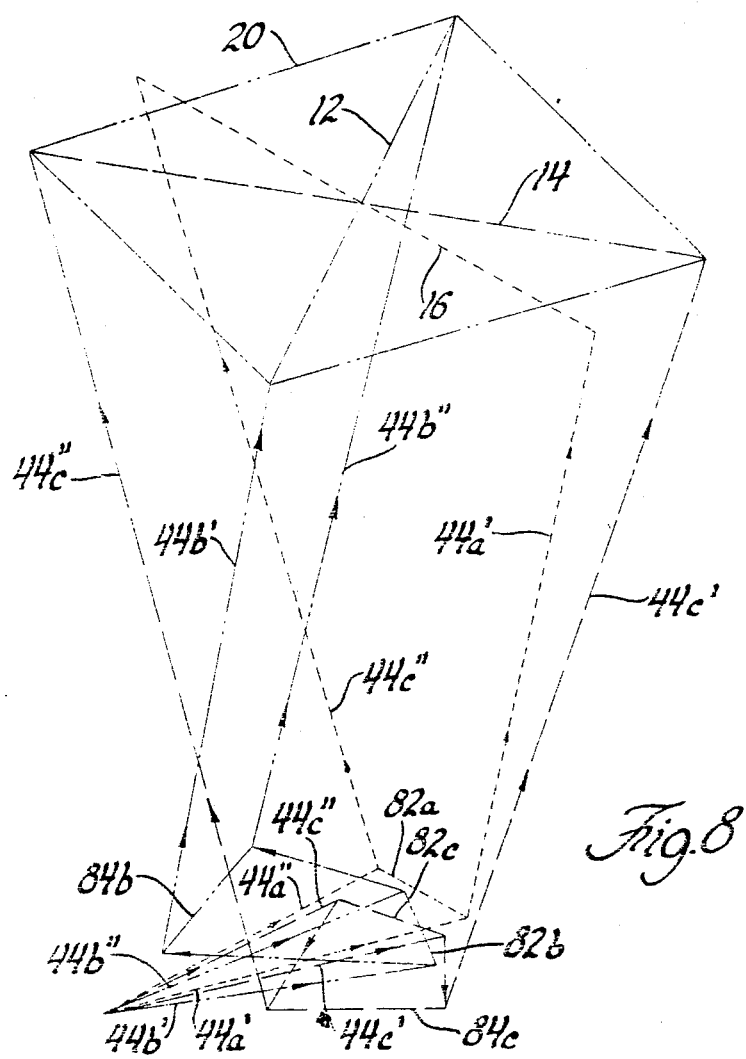
FIG. 8 is a diagram of optical paths to aid explanation of this invention.

The deflected beams and the respective trace segments are illustrated in the three-dimensional diagram of FIG. 8. In this diagram the light beam paths are shown without illustration of the reflectors or the window. The deflected beam 44a sweeps through an angle bounded by the path 44a' and the path 44a'' (also shown in FIG. 6) and in so doing produces a trace segment 82a on the reflector 64a (not shown in FIG. 8) which produces the line 16 on the window 2 (not shown in FIG. 8). In a similar manner the beam 44b sweeps through an angle bounded by a path 44b' and a path 44b'' and thereby produces a trace segment 82b on a reflector 72, a trace segment 84b on the reflector 74 and the line 12 on the window 2. In the same manner, the beam 44c sweeps through an angle bounded by a path 44c' and a path 44c'' and thereby produces a trace segment 82c on reflector 76, a trace segment 84c on reflector 78 and the line 14 on the window 2. It will be undestood that the light beam 44 is transformed into three time successive deflection beams 44a, 44b and 44c which are substantially continuous through the direction change at the transition between facets of succeeding reflectors. In this transition, the deflection plane is changed by reason of the change of facet angle which, in effect, tilts the deflection axis. Thus the scan pattern produced on the window 2 is comprised of three distinct lines, each of which is produced in a separate deflection plane.

In use of the subject optical scanner, there are several parameters of operation which significantly affect the opportunity to read a bar code symbol as it passes through the scanning field. One such parameter is the aspect ratio (degree of oversquareness or undersquareness) of the information code field as discussed above. Also, the speed of movement of the code symbol through the scanning field is an important parameter: in a retail point-of-sale label reader this is called product flow rate and, for design purposes, may be assumed to have a maximum value of 100 inches per second. Further, an important operating parameter is the scanning speed or the lineal speed of the spot in producing the trace. In the illustrative embodiment, the beam deflection means 46 has eight different sets of three reflectors 58a, 58b and 58c. The scanning member 54 is driven at a speed of 1800 rpm and thus it produces 240 scan patterns or frames per second. These parameters must be correlated with the scan pattern in order to optimize the opportunity to read the bar code symbol in any orientation. These parameters may vary, of course, from one application of the optical scanner to another.

The 3-line pattern of this invention provides a marked improvement over the prior art 2-line or X-scan patterns on the one hand, and the prior art multiple line scan patterns on the other hand. As to the multiple line scan patterns, the scanning apparatus is greatly simplified. As to the 2-line scan patterns, the opportunity to read is greatly enhanced, as will be discussed further below.

As is known, a 2-line scan pattern in the form of a 90° X-scan pattern can read a bar code symbol, provided that the symbol is at least square. It is understood, of course, that successful reading requires that all of the code elements in the information code field of the symbol be intersected by the scanning trace in immediate succession, i.e., in a single sweep across the code field. In the 90° X-scan pattern, the worst case for reading is with the code symbol moving through the pattern with a line of travel intersecting two lines of the pattern at 45° and with the code symbol oriented with the bars perpendicular to the line of travel. The scan trace of either line will intercept all of the code elements of the information code field only if the code field is at least square. In practice with a moving symbol, an opportunity to read will occur, in the worst case orientation, only if the information code field is somewhat oversquare and the product flow rate and the scan speed are so correlated that a complete scan is made in less time than it takes for the code field to move through a distance equal to the amount by which it is oversquare. When a third line is added to make a 3-line scan pattern, as in this invention, it not only increases the opportunity to read, for the same operating parameters, but it also affords operating advantages which cannot be achieved with the X-scan pattern. The increased opportunity to read follows, of course, from the fact that the addition of the third line enables the angle between adjacent lines to be reduced below 90°. If the opportunity to read is to be maximized, the 3-line pattern should be made equiangular so that the angle between adjacent lines is 60°. This configuration of the 3-line pattern provides opportunity to read not only square information code fields, but also those which are undersquare to a certain extent. In fact, the opportunity to read, given reasonable and conventional product flow rates and scan speeds, is great enough for oversquare symbols that this attribute of the 3-line pattern need not be maximized and may be compromised in favor of achieving other operating advantages. In particular, according to the preferred embodiment, the 3-line scan pattern is not equiangular; instead, the entrance angle $a$, as shown in FIG. 1, is substantially greater than 60° and less than 90°, for example, it is shown as about 80°. Further, the third line, i.e., trace 16, is directed perpendicular to the direction of product flow. This leaves the angle $b$ between the third line and each of the other traces at an angle substantially less than 60°, for example about 50°. This angular arrangement has the advantage of decreasing the "reach" required by the operator at the checkstand in passing the products through the scan field; in other words, the scan field is made shorter than it would be with an equiangular 3-line scan pattern. This improves operator efficiency and contributes to higher reliability in operation of the code reader. Additionally, the 3-line scan pattern, as compared to the X-scan pattern, is advantageous in that the operator need not be concerned about orienting the code symbol to improve readability. The product package can be passed through the scanning field with the code symbol in a vertical or tilted plane with the assurance of obtaining a reading of the code symbol. Furthermore, in the case of so-called "truncated" symbols, such as a symbol which is undersquare to a high degree as may be used on a package of gum, it is easy for the operator to orient a symbol relative to the third line to assure an opportunity to read.

In the scanning apparatus of this invention, the light beam from the source is time sequentially divided into line segments and each segment is used for producing a trace segment in the scanning field. Since only one beam segment is produced at a time, no beam splitting is necessary and therefore the full intensity of the source is applied through the intervening optical elements to the scanning field.

Although the description of this invention has been given with reference to a particular embodiment, it is not to be construed in a limiting sense. Many variations and modifications will now occur to those skilled in the art. For a definition of the invention, reference is made to the appended claims.

The embodiments of the present invention in which an exclusive property or privilege is claimed are defined as follows:

1. An optical scanner for reading bar code symbols, said scanner comprising a light beam source, beam deflection means in the path of the light beam from said source, said beam deflection means being operative to deflect said beam about a deflection axis and to tilt said deflection axis from one deflection plane to another after each beam deflection to produce three trace segments in three separate deflection planes, and trace segment orienting means in each of said deflection planes for redirecting the beam into a scanning field to produce three nonparallel trace segments on a surface in the scanning field.

2. The invention as defined in claim 1 wherein said beam deflection means comprises a rotatable member with at least one set of beam deflecting optical elements movable with said rotatable member through the path of said beam.

3. The invention as defined in claim 2 wherein each of said trace segment orienting means comprises reflector means, the reflector means in each of the deflection planes being positioned so that the beam reflected thereby produces a trace segment which intersects a common point on said surface.

4. The invention as defined in claim 3 wherein all beam paths produced by the deflection means from any one of the optical elements to said surface are of the same length.

5. The invention as defined in claim 4 wherein the beam path from the optical element to said surface is the same for all deflection planes.

6. The invention as defined in claim 3 wherein the reflector means in the three deflection planes are positioned so that the three trace segments on said surface are non-equiangularly displaced from each other, the angle between two of the trace segments being between 60° and 90° and the angle between the third trace segment and the said two trace segments being substantially less than 60°.

7. The invention as defined in claim 2 wherein said optical elements are reflectors.

8. The invention as defined in claim 7 wherein said set of optical elements include three reflectors having reflective surfaces at different angles relative to the axis of rotation of said member.

9. The invention as defined in claim 8 wherein said beam deflection means comprises plural sets of optical elements on said rotatable member, the elements in each set being arranged with a first element contiguous to a second element and the second element contiguous to a third element so they are intercepted successively by the beam.

10. An optical scanner for reading bar code symbols, said scanner comprising a light beam source, at least one set of three deflecting optical elements, rotatable means for moving said elements in succession through the path of said beam for causing deflection of the beam about a deflection axis, each of the elements in said set having a deflection axis angularly displaced from that of the other elements to cause the successive trace segments to occur in separate deflection planes, and reflector means in each of the deflection planes in the path of the beam for redirecting the beam into a scanning field to produce three intersecting trace segments on a surface in the scanning field.

11. The invention as defined in claim 10 wherein said optical elements are reflectors with reflective faces at different angles relative to the axis of rotation of said disc.

12. The invention as defined in claim 11 wherein the reflector means in each of the deflection planes are positioned so that the beam reflected thereby produces a trace segment which intersects the other two trace segments at a common point on said surface, all of the beam paths produced by the deflection means from any one of the optical elements to said surface are of the same length, and the beam path from the optical element to said surface is the same for all deflection planes.

13. The invention as defined in claim 12 wherein the reflector means in the three deflection planes are positioned so that the three trace segments on said surface are non-equiangularly displaced from each other, the angle between two of the trace segments being between 60° and 90° and the angle between the third trace segment and said two trace segments being substantially less than 60°.

14. In a bar code symbol reader, a counter top including a window defining a rectangular scanning field, said counter top being adapted to receive an article bearing a code symbol and to provide a passage for manual movement of said article through said scanning field above the surface of said window, said passage extending from an entrance to an exit of said scanning field, an optical scanner disposed beneath said counter top, said scanner comprising a light beam source, optical means in the path of said light beam for producing three spatially separated beams, means for directing said beams convergently toward said scanning field, means for cyclically deflecting each of said spatially separated beams whereby each beam produces a trace segment on said window, first and second of said beams producing respective first and second trace segments extending along the respective diagonals of said rectangular scanning field, the intersection of said first and second trace segments forming an angle opposite the entrance to said passage of substantially less than 90°, the third beam producing a third trace segment extending perpendicularly to the direction of said passage.

15. The invention as defined in claim 14 wherein all of said trace segments have a common point of intersection on said window.

* * * * *